Patented Apr. 5, 1938

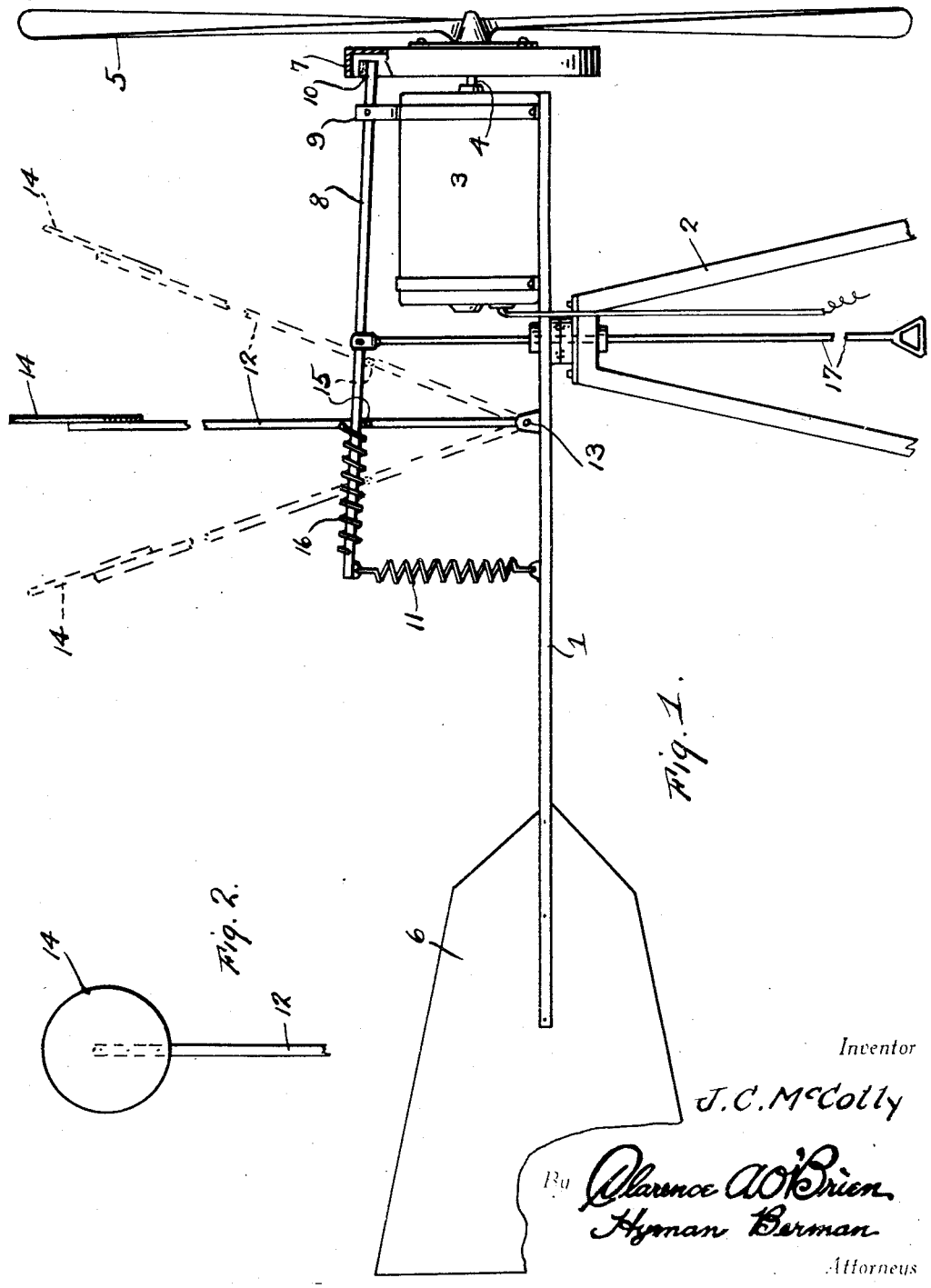

2,112,900

UNITED STATES PATENT OFFICE 2,112,900

WIND WHEEL BRAKE

John C. McColly, Hinsdale, Mont.

Application July 1, 1937, Serial No. 151,496

2 Claims. (Cl. 170—47)

This invention relates to a brake for a wind wheel which operates a generator, the general object of the invention being to provide means whereby the wheel is held against movement when the wind is so light as to not run the wheel fast enough to generate current, and also when the wind is so strong as to rotate the wheel at such speed as might damage the parts, the wheel only operating when the wind is such as to efficiently operate the wheel to produce current from the generator.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is an elevation, with parts in section, of the invention applied to a wind wheel for operating a generator.

Figure 2 is a front view of the disk on the brake operating rod.

In this drawing, the numeral 1 indicates a platform rotatably arranged on the tower 2 and supporting the generator 3, the shaft 4 of which has attached thereto the wind wheel 5, so that movement of the wheel by the wind will actuate the generator. The usual vane 6 is connected to the rear end of the platform to keep the wheel in the wind.

In carrying out my invention, I fasten a brake drum 7 to the shaft 4 and provide a brake lever 8 which is pivoted to an upright 9 on the platform. This upright may be a part of the means which connect the generator to the platform. A brake shoe 10 is connected to the front end of the brake lever for engaging the inner circumference of the brake drum, and a spring 11 connects the rear end of the brake lever with a part of the platform and tends to hold the shoe against the drum. A vertically arranged vane lever 12 is pivoted to the platform, as shown at 13, and has a vane or disk 14 connected with its upper end, so that the vane lever will be acted on by the wind. A projection having a roller 15 thereon is carried by the vane lever 12 and engages the under edge of the lever 8, and a spring 16 on the brake lever 8 tends to hold the vane lever 12 in a forward inclined position, as shown in dotted lines in Figure 1. When the vane lever 12 is in this position, it will not interfere with the application of the brake shoe against the drum by the spring 11, and thus the wheel or propeller 5 will be held against movement. When the wind increases to a certain extent, it will act on the disk or vane 14 and move the vane lever 12 to a vertical position, as shown in full lines in Figure 1, and in this position the roller 15 will tilt the brake lever 8 so as to release the shoe from the drum and thus the wheel 5 can rotate. If the wind increases, it will move the vane lever 12 and the vane 14 to the rear dotted line position, and in this position the spring 11 can move the brake lever 8 to again apply the brake, so that the wind wheel will be held against movement.

The brake can be applied when the wind is very light and when it is very heavy, so that the wheel will only rotate when the speed of the wind is such as to cause the wheel to operate the generator in the most efficient manner. The spring 16 will move the vane lever 12 back to a vertical position when the heavy wind has died down, and then when the wind becomes light, the spring 16 will move the vane lever 12 to the front dotted line position, and then the brake will be applied and the wheel stopped.

The brake can be adjusted by hand by means of the rod 17 connected to the brake lever 8.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A brake for a wind wheel comprising a drum and a shoe, a wind-operated member, means for yieldably holding the shoe in contact with the drum, and means operated by the wind-operated member for moving the shoe out of engagement with the drum when the wind is blowing at a predetermined speed.

2. In a windmill, including a platform, a wheel mounted thereon and a vane connected to the rear end of the platform, a brake drum connected with the wheel, a support on the platform, a brake lever pivoted on the support, a shoe carried by the lever for engaging the drum, a spring for normally holding the lever in position, with the shoe engaging the drum, a vane carrying lever pivoted at its lower end to the platform and having a vane at its upper end so constructed and arranged that the vane lever will be moved by the wind, a projection on the vane lever engaging an under part of the brake lever, and spring means for holding the vane carrying lever in a forward position, with the brake applied, the wind at normal speed moving the vane and its lever to a position to release the brake, and said vane and its lever moving rearwardly by a heavy wind to cause application of the brake.

JOHN C. McCOLLY.